United States Patent [19]

Inada et al.

[11] Patent Number: 5,024,083

[45] Date of Patent: Jun. 18, 1991

[54] TERMINAL FLOW SENSOR

[75] Inventors: Masanori Inada; Hichiro Ohtani, both of Himeji, Japan

[73] Assignee: Mitsubishi Denki Kabushiki Kaisha, Tokyo, Japan

[21] Appl. No.: 451,058

[22] Filed: Dec. 15, 1989

[30] Foreign Application Priority Data

Dec. 16, 1988 [JP] Japan ............................ 63-163900[U]

[51] Int. Cl.⁵ .............................................. G01F 1/68
[52] U.S. Cl. ................................. 73/204.26; 73/204.21
[58] Field of Search ................ 73/189, 204.18, 204.21, 73/204.22, 204.23, 204.26

[56] References Cited

U.S. PATENT DOCUMENTS

| 4,366,709 | 1/1983 | Eiermann et al. | 73/204.22 |
| 4,587,842 | 5/1986 | Handtmann | 73/204.14 |
| 4,843,882 | 7/1989 | Ohta et al. | 73/204.26 |

FOREIGN PATENT DOCUMENTS

| 0208412 | 12/1982 | Japan | 73/204.26 |
| 0206715 | 11/1984 | Japan | 73/204.21 |

Primary Examiner—Herbert Goldstein
Attorney, Agent, or Firm—Sughrue, Mion, Zinn, Macpeak and Seas

[57] ABSTRACT

A thermal flow sensor has a heat-sensitive resistor which is disposed at a predetermined angle relative to the line of stream of a fluid, and which has its heat-sensitive portion disposed on the surface portion of a substrate which is positioned downstream in the direction in which the fluid flows. Since the heat-sensitive resistor is already disposed at a predetermined angle relative to the line of stream of the fluid, this permits only slight influence on, hence, variation in detection characteristic to be caused by deviation in the disposition angle. Since the heat-sensitive portion is disposed on a surface portion positioned downstream in the direction of fluid flow, this restrains dust contained in air from directly depositing on the heat-sensitive portion, hence, from causing variation in detection characteristic.

2 Claims, 4 Drawing Sheets

TERMINAL FLOW SENSOR

BACKGROUND OF THE INVENTION

The present invention relates to a thermal flow sensor in which a heat-sensitive resistor is employed to detect the flow of a fluid.

Hitherto, a method of detecting the flow of a fluid from the equilibrium state of a bridge circuit including a heat-sensitive resistor disposed in the fluid has been applied to thermal flow sensors such as that disclosed in Japanese Utility Model Laid-Open No. 61-108930. A description will be given, with reference to some of the drawings, of a conventional air flow sensor in which a heat-sensitive resistor is employed as a heating resistor which comprises a ceramic substrate and a platinum thin-film resistor formed on the substrate.

FIG. 1 schematically shows the arrangement of a conventional thermal flow sensor in which a heat-sensitive resistor is provided. As shown in the figure, a base 2 is provided at a predetermined position within a housing 1 defining the main passage of a fluid. A heat-sensitive resistor $R_{H1}$ and an air temperature sensor Rc are disposed on the base 2. Each of the group consisting of the heat-sensitive resistor $RH_1$ and a resistor $R_1$, and the group consisting of the air temperature sensor Rc and another resistor $R_2$ is connected in series, and these elements form a bridge circuit.

The heat-sensitive resistor $R_{H1}$ has a structure such as that shown in FIG. 2. A heat-sensitive resistor portion 7b is formed on one surface of a thin-plate substrate 7a. The thin-plate substrate 7a is disposed in parallel with the direction 6 in which the fluid, e.g., air, flows. This arrangement is provided in order to prevent dust contained in air from depositing on the resistor $R_{H1}$, hence, from causing variations in the characteristic of the resistor $R_{H1}$.

The thermal flow sensor shown in FIG. 1 also includes a control circuit 10 in which the junction a between the heat-sensitive resistor $R_{H1}$ and the air temperature sensor Rc, partially forming the bridge circuit, is connected to the emitter of a transistor 4. Also in this circuit 10, the junction b between the heat-sensitive resistor $R_{H1}$ and the resistor $R_1$, and the junction f between the air temperature sensor Rc and the resistor $R_2$ are connected to the input terminals of a differential amplifier 3. The output of the differential amplifier 3 is applied to the base of the transistor 4. The collector of the transistor 4 is connected to the positive electrode of a DC power source 5, the negative electrode of the power source 5 being grounded.

The operation of the thermal flow sensor having the above-described construction is already known. Therefore, the operation will not be described in detail, and it will be briefly outlined. When the voltage at the junction b and that at the junction f have become equal to each other, the bridge circuit achieves its equilibrium state. At this time, the heat-sensitive resistor $R_{H1}$ allows the passage therethrough of current $I_H$ having a magnitude corresponding to the flow of air. The voltage $V_O$ at the junction b is expressed as $V_O = I_H \times R_1$, and the voltage $V_O$ is used as a flow signal.

By virtue of the structure described before with reference to FIG. 2, that is, the structure in which the heat-sensitive resistor $R_{H1}$ is disposed in parallel with the air flow direction 6, dust mixed with air forming the flow deposits only on a thick plate portion 11 at an upstream position of the thin-plate substrate 7a of the heat-sensitive resistor $R_{H1}$. This permits dust deposition to cause a great extent of variation in the thermal characteristic of the heat-sensitive resistor $R_{H1}$.

The conventional thermal air flow sensor having the above-described construction involves the following problem because of the structure where the heat-sensitive resistor $R_{H1}$ is disposed in parallel with the air flow direction 6, as shown in FIG. 2. When the heat-sensitive resistor $R_{H1}$ is being disposed in the above-described manner so as to serve as the main component part of the air flow sensor, if the angle of the resistor $R_{H1}$ relative to the air flow direction 6 deviates from the correct angle, this results in the air receiving area varying to a relatively great extent. In such cases, therefore, there is the risk that a slight deviation in the disposition angle may lead to a considerable level of detection errors.

The problem will be explained with reference to FIGS. 3A, 3B, and 4. FIGS. 3A and 4 are graphs obtained from experiments, and they show examples of variations in detection characteristic from the reference characteristic, which may result from variations in the angle $\theta 0$ at which the heat-sensitive resistor $R_{H1}$ is disposed relative to the air flow direction 6, as shown in FIG. 3B, whereas the reference characteristic is achievable when $\theta = 0$. FIG. 3A shows shifts in detection characteristic plotted against change in the air flow. FIG. 4 shows the proportion in which detection output varies with variation in the disposition angle $\theta$ when the flow is a, b or c. It is understood from these graphs that a slight deviation in the angle at which the resistor is disposed results in a great variation in detection characteristic from the reference characteristic that is achievable when $\theta = 0$. For instance, when the flow is c, if the disposition angle $\theta$ deviates by 5 degrees, detection characteristic varies by + 13%. When the disposition angle $\theta$ is a large value, detection characteristic varies to a slight extent. For instance, when the flow is c, if the disposition angle $\theta$ which is 30 degrees changes by 5 degrees, substantially no change occurs in the detection characteristic.

SUMMARY OF THE INVENTION

The present invention has been accomplished to overcome the above-stated problem. It is an object of the present invention to provide a thermal flow sensor which is capable of eliminating variations in the angle at which the heat-sensitive resistor is disposed relative to the fluid flow during assembling and, hence, variations in detection characteristic, while being capable of maintaining at a negligible level of variation in characteristic due to the deposition of dust contained in air, the thermal flow sensor thus assuring stable detection of flow for a long period.

According to the present invention, there is provided a thermal flow sensor comprising: a heat-sensitive resistor disposed in the stream of a fluid, the resistor having a substrate and a heat-sensitive resistor portion whose resistance changes with change in the temperature of the resistor; a bridge circuit including the heat-sensitive resistor and a plurality of other resistors; and a control circuit for controlling the bridge circuit in such a manner that the bridge circuit maintains a predetermined equilibrium state thereof and for detecting the flow of the fluid from the equilibrium state, wherein the heat-sensitive resistor is disposed at an angle ranging from 20 to 60 degrees relative to the direction in which the fluid flows, and the heat-sensitive resistor portion is disposed on the surface portion of the substrate which is positioned downstream in the direction in which the fluid flows.

DESCRIPTION OF THE PREFERRED EMBODIMENT

An embodiment of the thermal flow sensor in accordance with the present invention will be explained with reference to the drawings.

Figure 5A:
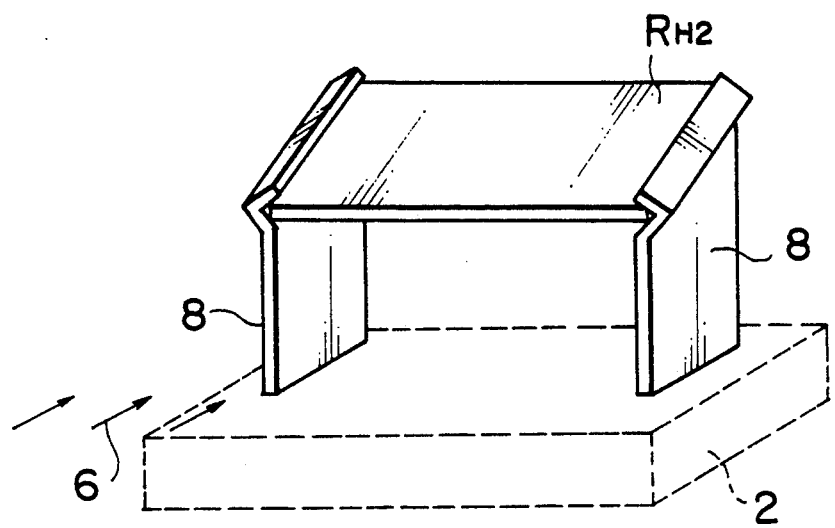
FIG. 5A is a perspective view showing a heat-sensitive resistor of a thermal flow sensor in accordance with the present invention.
Figure 5B:
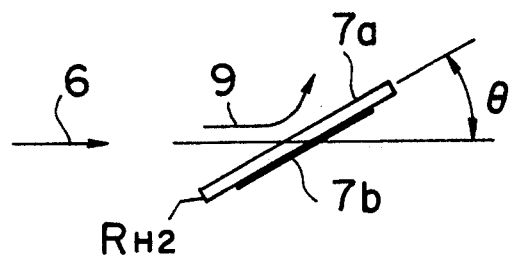
FIG. 5B is a side view schematically showing the heat-sensitive in FIG. 5A.

FIG. 5A is a perspective view showing the manner in which a heat-sensitive resistor embodying the present invention is disposed in a fluid, e.g., air, whose flow is to be detected. As shown in this figure, a flat-plate-shaped heat-sensitive resistor $R_{H2}$ is mounted above a base 2 with electrically conductive supporting members 8 interposed between them. The heat-sensitive resistor $R_{H2}$ is disposed at an angle $\theta$ relative to the direction 6 in which the fluid flows, the initial value of the disposition angle $\theta$ being set at an angle which is at least 20 degrees but is not more than 60 degrees. As shown in FIG. 5B, the heat-sensitive resistor $R_{H2}$ comprises a thin-plate substrate 7a and a heat-sensitive resistor portion 7b, the resistor portion 7b being disposed at a downstream position in the direction 6 in which the fluid flows, that is, in the illustrated example, disposed on a lower surface portion of the thin-plate substrate 7a which is positioned downstream in the above-mentioned direction. In the illustrated example, the disposition angle $\theta$ is measured in the counterclockwise direction. However, it may be measured in the clockwise direction, in which case, the heat-sensitive resistor portion 7b is disposed on an upper surface portion of the thin-plate substrate 7a.

Figure 1:
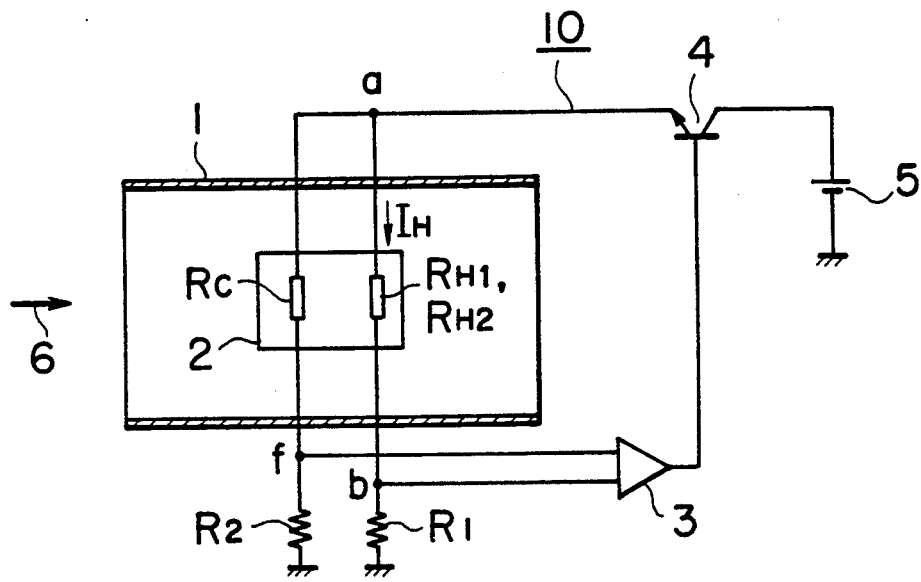
FIG. 1 is a view schematically showing the arrangement of a thermal flow sensor.
Figure 2:
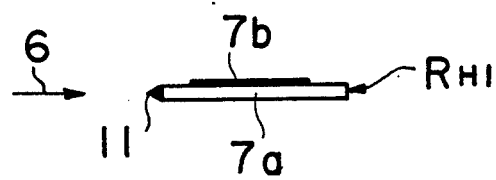
FIG. 2 is a side view schematically showing the manner in which a heat-sensitive resistor of a conventional thermal flow sensor is disposed relative to the direction in which a fluid flows.
Figure 3A:
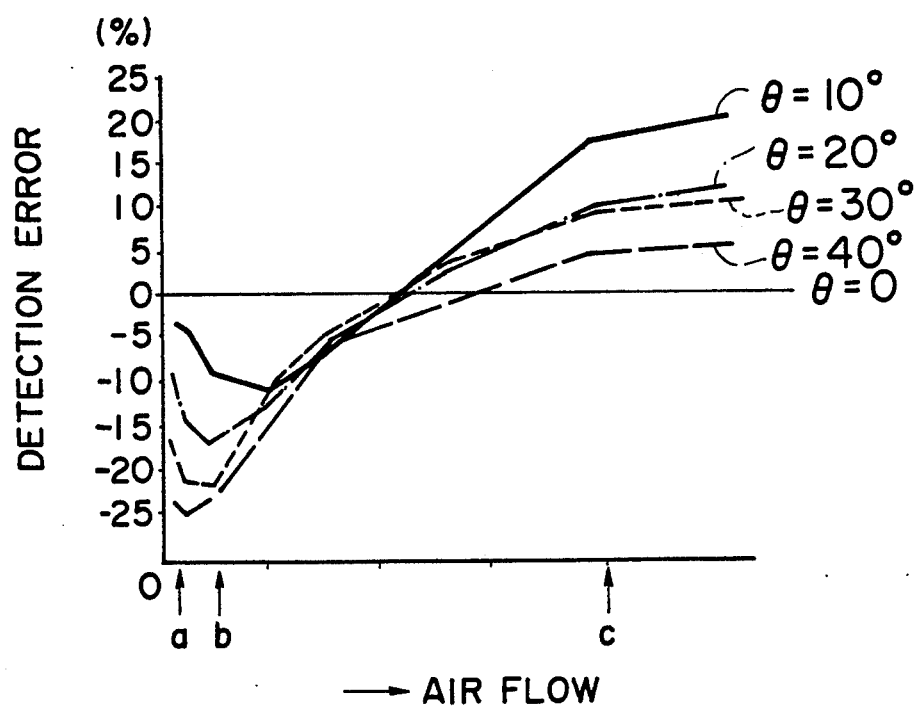
FIG. 3A is a graph showing detection errors which may occur when a heat-sensitive resistor is disposed at various angles relative to the direction of fluid flow.
Figure 3B:
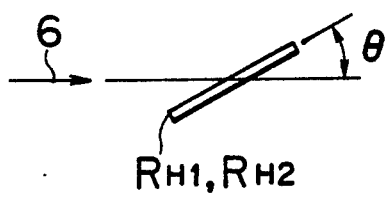
FIG. 3B is a side view used to explain a heat-sensitive resistor disposed at a predetermined angle relative to the direction of fluid flow.

An air temperature sensor Rc is provided on the base 2 as shown in FIG. 1, above which the heat-sensitive resistor $R_{H2}$ is mounted with the intervention of the supporting members 8. The base 2 is provided at a predetermined position within a housing 1, as also shown in FIG. 1. The group consisting of the heat-sensitive resistor $R_{H2}$ and a resistor $R_1$, and the group consisting of the air temperature sensor Rc and a resistor $R_2$, are each connected serially in such a manner that these members form a bridge circuit. The thermal flow sensor also includes a control circuit 10 including a differential amplifier 3, a transistor 4, the resistors $R_1$, and $R_2$, and a DC power source 5, this arrangement being the same as that of the conventional apparatus.

Figure 4:
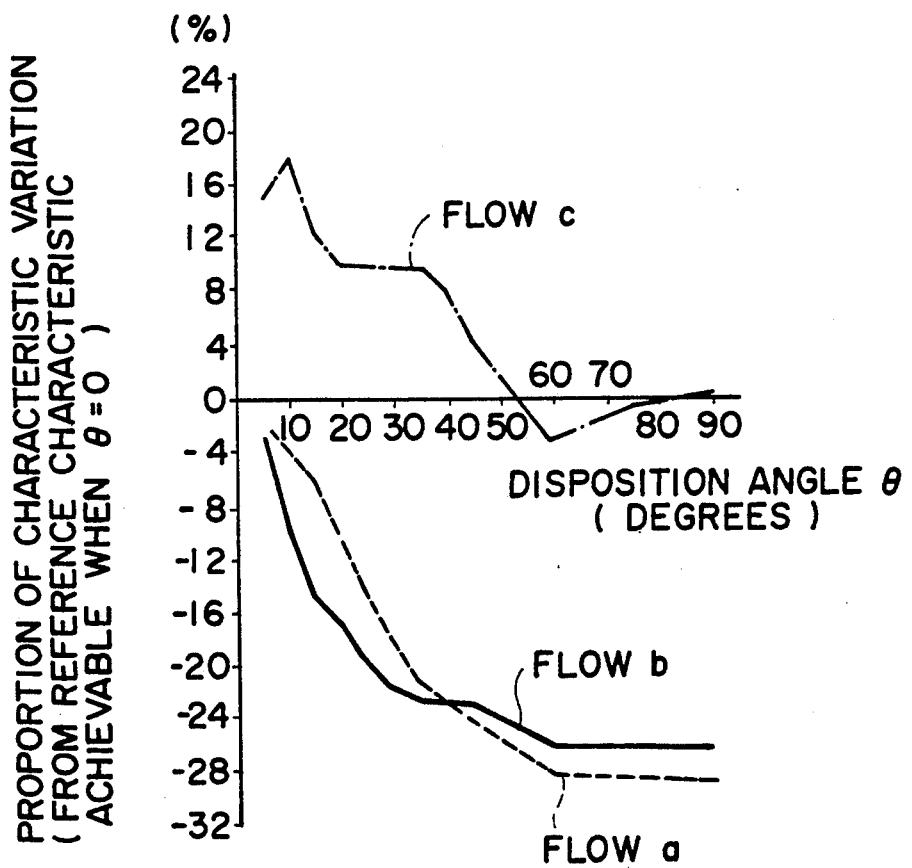
FIG. 4 is a graph showing the proportion in which detection characteristic varies with variation in the angle at which a heat-sensitive resistor is disposed relative to the direction of fluid flow.

According to the present invention, the heat-sensitive resistor $R_{H2}$ is mounted above the base 2 at a predetermined angle. Therefore, even when any error has occurred during assembly in the mounting angle, this deviation leads to less influence on and less variation in detection characteristic as compared with the case where the initially set angle is 0 degrees, as will be understood from the graph shown in FIG. 4. This feature enables the thermal flow sensor to operate with a high level of precision.

Although the disposition angle $\theta$ should preferably be as great as possible, if it exceeds 60 degrees, dust contained in air tends to easily deposit on a surface portion of the thin-plate substrate 7a which is positioned upstream in the air flow direction. Therefore, the disposition angle $\theta$ should be not more than 60 degrees. With such an angle, dust contained in air flows along a line 9 of stream, shown in FIG. 5B, thereby reducing the risk of dust deposition. Even when a small amount of dust has deposited, since the dust has not directly deposited on the surface of the heat-sensitive portion 7b, this dust deposition only leads to variation in detection characteristic within a negligible range. On the other hand, a disposition angle $\theta$ which is less than 20 degrees is not preferred because such an angle can lead to great variation in detection characteristic. For the above-described reasons, the angle $\theta$ at which the heat-sensitive resistor $R_{H2}$ is disposed in the range from 20 to 60 degrees.

Thus, the heat-sensitive resistor $R_{H2}$ is disposed relative to the fluid flow direction at an angle within the range from 20 to 60 degrees, thereby permitting only slight variation in detection characteristics to be caused by variation in the mounting angle which may occur during assembly or the like. Furthermore, the heat-sensitive resistor portion 7b is disposed on a surface portion of the thin-plate substrate 7a which is positioned downstream in the fluid flow direction, thereby limiting, within a negligible level, the level of variation in detection characteristic due to the deposition of dust contained in the fluid, thereby also permitting only slight variation in detection characteristic. The thermal flow sensor according to the present invention is therefore capable of detecting flow stably for a long period.

What is claimed is:

1. A thermal flow sensor, comprising:
   a heat-sensitive resistor disposed in a flow stream of a fluid, said resistor having a planar substrate (7a) and a planar heat-sensitive resistor portion (7b) whose resistance changes with temperature;
   a bridge circuit including said heat-sensitive resistor and a plurality of other resistors; and
   a control circuit for controlling said bridge circuit in such a manner that said bridge circuit maintains a predetermined equilibrium state and for detecting the flow of the fluid from the equilibrium state,
   wherein said substrate is disposed at an angle ranging from 20 to 60 degrees relative to the direction of fluid flow, and said heat-sensitive resistor portion is exclusively disposed on a surface of said substrate oriented downstream in the direction of fluid flow such that said resistor portion is sheltered from the fluid flow by the substrate to attendantly avoid the deposition of dust entrained in the fluid, said thermal flow sensor further comprising a housing allowing the passage therethrough of the fluid, a base (2) provided within said housing for supporting said heat-sensitive resistor, and a fluid temperature sensor provided on said base.

2. A thermal flow sensor according to claim 1 wherein said fluid temperature sensor is an air temperature sensor.